United States Patent
Fries et al.

(10) Patent No.: US 8,172,339 B2
(45) Date of Patent: May 8, 2012

(54) COMPRESSED AIR SUPPLY SYSTEM FOR A UTILITY VEHICLE

(75) Inventors: Ansgar Fries, Munich (DE); Eduard Hilberer, Hockenheim (DE)

(73) Assignee: Knorr-Bremse fuer Nutzfahrzeuge GmbH, Munich (DE)

( * ) Notice: Subject to any disclaimer, the term of this patent is extended or adjusted under 35 U.S.C. 154(b) by 634 days.

(21) Appl. No.: 12/273,382

(22) Filed: Nov. 18, 2008

(65) Prior Publication Data

US 2009/0127926 A1 May 21, 2009

Related U.S. Application Data

(63) Continuation of application No. PCT/EP2007/004421, filed on May 16, 2007.

(30) Foreign Application Priority Data

May 19, 2006 (DE) .......................... 10 2006 023 632

(51) Int. Cl.
*B60T 13/20* (2006.01)
*F16D 31/02* (2006.01)
(52) U.S. Cl. .............................. 303/11; 60/329; 417/223
(58) Field of Classification Search ................ 303/3, 10, 303/11; 60/327, 329, 445, 449, 459; 417/18, 417/22, 32, 42, 212, 223
See application file for complete search history.

(56) References Cited

U.S. PATENT DOCUMENTS

| 5,114,315 A | * | 5/1992 | Kaltenthaler et al. ........ 417/18 |
| 6,089,831 A | | 7/2000 | Bruehmann et al. |
| 7,080,891 B1 | | 7/2006 | Hilberer |

FOREIGN PATENT DOCUMENTS

| DE | 39 23 882 A1 | 9/1990 |
| DE | 195 15 895 A1 | 10/1996 |
| DE | 198 34 705 A1 | 2/2000 |
| DE | 199 36 283 A1 | 2/2001 |
| EP | 1 386 811 A1 | 2/2004 |

OTHER PUBLICATIONS

International Search Report dated Nov. 16, 2007 w/English translation (four (4) pages).

* cited by examiner

*Primary Examiner* — Thomas J Williams
(74) *Attorney, Agent, or Firm* — Crowell & Moring LLP

(57) ABSTRACT

A compressed air supply system for a utility vehicle includes a compressor that can be driven by a drive by a pneumatic clutch, and a valve that can be actuated by an electrical signal for the selective supply of compressed air to a control input of the clutch. The electrical signal is provided by an electronic control system to which signals indicating an operating state of a compressed air preparation system and various vehicle states can be supplied.

19 Claims, 3 Drawing Sheets

COMPRESSED AIR SUPPLY SYSTEM FOR A UTILITY VEHICLE

CROSS REFERENCE TO RELATED APPLICATIONS

This application is a continuation of PCT International Application No. PCT/EP2007/004421, filed May 16, 2007, which claims priority under 35 U.S.C. §119 to German Patent Application No. DE 10 2006 023 632.7, filed May 19, 2006, the entire disclosures of which are herein expressly incorporated by reference.

This application contains subject matter related to U.S. application Ser. Nos. 12/273,242 (now U.S. Pat. No. 7,802,425), 12/273,388 and 12/273,255 (now U.S. Pat. No. 7,886,532) entitled "Method for Controlling or Regulating the Air Pressure in a Compressed Air Supply Device," "Compressed Air Supply System for a Utility Vehicle," and "Compressed Air Supply Device for a Utility Vehicle," respectively, all filed on Nov. 18, 2008.

BACKGROUND AND SUMMARY OF THE INVENTION

The present invention relates to a compressed air supply system for a utility or commercial vehicle, with a compressor drivable by a drive via a pneumatically switchable coupling, and a valve, actuatable by means of an electrical signal, for the selective delivery of compressed air to a switch input of the coupling.

Compressed air supply systems are of central importance for utility vehicles. In particular, the brake system or a pneumatically braked utility vehicle requires compressed air, as do numerous further consumers, for example air suspensions or lift axle devices. The compressed air to be prepared and distributed by the compressed air supply system is delivered by a compressor which is generally driven by the internal combustion engine of the utility vehicle. In a concept which is common in this regard, the compressor is coupled to the internal combustion engine via a pneumatically switchable coupling, the compressed air for the pneumatic activation of the coupling being extracted, in turn, from the compressed air supply system. An example of a system of this type is given in DE 39 23 882 C2.

Owing to the switchability of the coupling, the operation of the compressor can be interrupted, as required, for example during the regeneration phases of the filter unit. The decoupling of the compressor from the internal combustion engine can likewise be used in a directed manner with regard to the energy balance of the utility vehicle.

However, implementing a concept with a switchable coupling is not without problems in all aspects. In particular, the coupling is to be transferred at suitable time points into the state desired in each case, and the suitability of these time points may depend on numerous factors. These factors may be directly related to the internal combustion engine, coupling and/or compressor. In terms of the internal combustion engine, in particular, the current load state and the energy consumption are to be taken into account. Where the coupling is concerned, its functioning capacity is to be taken into account. As regards the compressor, undesirable overheating states are to be avoided. However, the factors mentioned also relate to the compressed air preparation and here, in particular, the pressures and temperatures prevailing in the region of the compressed air preparation plant, and also the possible need for a regeneration of the filter unit.

The object on which the invention is based is to make a available a compressed air supply system with a switchable coupling on the basis of a cost-effective and particularly functionable concept, while taking into account a multiplicity of factors relating to the compressed air preparation.

The invention builds on the generic compressed air supply system in that the electrical signal is made available by an electronic control, to which signals characterizing an operating state of a compressed air preparation plant and other vehicle states can be delivered. The decision to change over the coupling could therefore be taken, including all the information which is made available to the electronic control. Since this information is generally not restricted to the compressed air preparation, but, on account of the use of modern vehicle electronics, also relates to other information which, for example, is delivered from a vehicle management computer to a CAN bus, a coupling control adapted to all important parameters can take place.

According to a particularly advantageous embodiment of the invention, there is provision for the electronic control to be integrated into a compressed air preparation plant. This can be implemented, in practice, in that the conventional electronic control of the compressed air preparation plant is extended to include the functionality of coupling activation.

It is also conceivable, however, that the electronic control communicates via an interface with a control integrated into a compressed air preparation plant. On this basis, the conventional electronic control of the compressed air preparation plant can remain largely unchanged, and the switching functionality for the coupling can be available externally.

There may likewise usefully be provision for the electrical signal to be made available by an electronic control which receives pressure-dependent input signals. The signal from the pressure switch is thus first delivered to an electronic control which then, if appropriate, outputs the signal for the valve. The advantage of this is that other parameters present in the utility vehicle can be taken into account in terms of the operation of changing over the coupling.

For example, there may be provision for the electrical signal to be made available by an electronic control which receives temperature-dependent input signals. Thus, for example, the temperature in the region of the compressor can be measured, in order, in the case of an increased temperature, to bring about a decoupling of the compressor from the internal combustion engine.

It is likewise possible for the electrical signal to be made available by an electronic control which receives input signals dependent on the input-side and/or output-side rotational speed of the coupling. A monitoring of the rotational speeds in the region of the coupling may also be useful, for example with a view to fault diagnosis.

The compressed air supply system according to the invention may be designed, for example, such that an additional electrical signal is made available by a pressure switch which responds to a pressure in a compressed air preparation plant. One reason for decoupling the internal combustion engine and compressor may be the presence of a sufficient pressure within the compressed air preparation plant or in the region of the consumer connections. It is consequently useful to convert this pressure into an electrical signal which then, in turn, causes the decoupling of the internal combustion engine and compressor. With an appropriate coordination of pressure switch and valve, the signal can be delivered to the valve directly or by means of further electrical or electronic components.

Preferably, there is provision for the valve to be arranged in the region of a fresh air supply to the compressor. High temperatures prevail in the region of the internal combustion engine, and therefore the switching members, that is to say, in particular, pneumatically and/or electrically activatable valves, must be designed correspondingly, thus entailing correspondingly high costs. In the region of the air supply to the compressor, that is to say, in particular, at the intake connection piece of the latter, comparatively low temperatures prevail, so that a valve can be used, without special account being taken of temperature resistance. In addition, the arrangement mentioned affords the advantage that a particularly short line path may be provided between the valve and the switchable coupling, thus shortening the changeover times of the coupling. This is advantageous particularly in plants which are intended to bring about a frequent changeover of the coupling.

There is usefully provision for the valve to be an electrically pilot-controllable pneumatic valve. Such a valve, because of the high air throughput achievable, makes it possible to have a rapid pressure build-up at the switching member of the coupling, so that this measure, too, increases the switching speed.

According to a particularly advantageous embodiment of the invention, there is provision for the compressed air delivered to the switch input via the valve to be extracted from a compressed air preparation plant via a nonreturn valve. In order to ensure a high switching speed in the case of a pneumatic valve, delivery to a pneumatic valve must preferably be maintained at a certain pressure level. Consequently, during the opening of the valve, a sufficient pressure is immediately present which can then also quickly cause the changeover of the coupling via the short line to the coupling. Since the compressed air for changing over the coupling is preferably extracted from a compressed air preparation plant which also supplies other consumers with compressed air, a pressure level, sufficient during the ventilating operation, in the line leading to the pneumatic valve is often ensured by an additional pressure reservoir. This is unnecessary if the compressed air delivered to the switch input via the valve is extracted via a nonreturn valve, since the latter prevents a pressure breakdown in the pressure delivery line on account of other effects in the region of the compressed air preparation plant and the consumers connected to it.

According to a preferred embodiment, there may be provision for the nonreturn valve to be integrated into the compressed air preparation plant. An essential constituent of the compressed air preparation plant is a valve housing which has at least one circuit protection device and which makes it possible readily to incorporate a further nonreturn valve by dealing with a merely structural task. However, the external arrangement of the nonreturn valve may also likewise be envisaged.

The invention relates, furthermore, to a utility vehicle having a compressed air supply system according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, the same reference symbols designate identical or comparable components.

Figure 1:
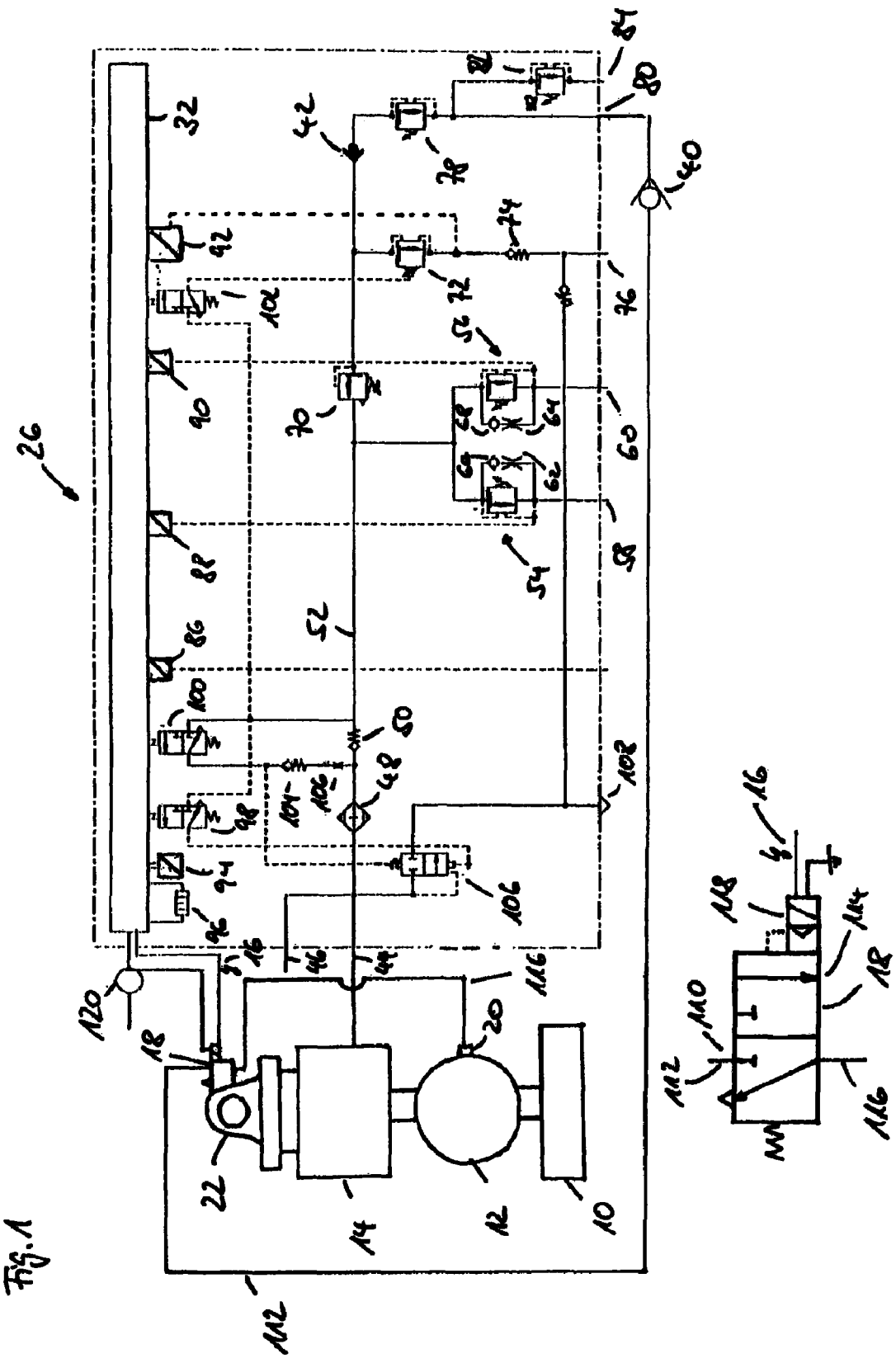
FIG. 1 shows a diagrammatic illustration of a compressed air supply system according to the invention.

FIG. 1 shows a diagrammatic illustration of a compressed air supply system according to the invention. A compressed air preparation plant 26 is illustrated. By means of this, delivered compressed air is filtered and distributed to various compressed air consumers. An input connection 44 is provided, which is connected to a compressor 14 provided outside the compressed air preparation plant 26. An extraneous filling connection 46 is arranged parallel to the input connection 44. The compressed air delivered to one of the inputs 44, 46 is delivered to a filter unit 48 and from there, via a nonreturn valve 50, to a main supply line 52. Arranged in parallel on the main supply line 52 are two overflow valves 54, 56, via which connections 58, 60 for service brake circuits of the utility vehicle, are supplied with compressed air. A throttle 62, 64 and a nonreturn valve 66, 68 are arranged in each case parallel to the overflow valves, according to the present embodiment a flow parallel to the flow through the overflow valves 54, 56 being made possible from the main supply line 52 to the connections 58, 60 of the service brake circuits. As a result, particularly during the refilling of the system, an early filling of the service brake circuit reservoirs can take place even when the pressures in the main supply line 52 are low. It is likewise possible to provide the nonreturn valves in the opposite direction, this refilling benefit being dispensed with. As a result, an afterfilling of secondary consumers from the reservoirs of the service brake circuits is then made possible. Furthermore, a pressure limiter 70 is provided in the main supply line 52. Two further lines branch off in parallel on the pressure-limited side of the pressure limiter 70, a connection 76 for the parking brake and the trailer brake system being supplied by one line via an overflow valve 72 and a nonreturn valve 74. The other line, via a nonreturn valve 42 and an overflow valve 78, supplies a connection 80 which is provided for actuating the compressor coupling 12. The overflow valve 78 is followed in a branching-off line by a further overflow valve 82, via which a further secondary consumer connection 84 is supplied.

A plurality of pressure sensors 86, 88, 90, 92 are connected to the electronic control 32, the pressure sensor 88 measuring the pressure at the service brake connection 58, the pressure sensor 90 measuring the pressure at the service brake connection 60 and the pressure sensor 62 measuring the pressure directly downstream of the overflow valve 72 for the connection 76 of the parking brake and trailer. Furthermore, a temperature sensor 94 and a heating 96 are connected to the electronic control 32. Moreover, three solenoid valves 98, 100, 102 are connected to the electronic control 32, the pressure controller solenoid valve 98, the regeneration solenoid valve 100 and a solenoid valve 102 for the additional pressure control of the overflow valve 72. The solenoid valves 78, 100, 102 are designed as 3/2-way valves and all are closed in the currentless state. In the closed state, the pressure of the main supply line 52 is present at the inputs of the solenoid valves 98, 100, 102. To initiate a regenerating operation, it is necessary to apply current to the regeneration solenoid valve 100 and the pressure controller solenoid valve 98 and thus transfer them into their state which is not illustrated. The result of this is that dry compressed air is extracted from the service brake reservoirs via the main supply line 52 and then, bypassing the nonreturn valve 50, flows in the opposite direction, via the regeneration solenoid valve 100, a further nonreturn valve 104 and a throttle 106, through the filter unit 48, in order then, via a discharge valve 106 changed over into its switching position, not illustrated, on account of the changeover of the pressure controller solenoid valve 98, to flow out to a discharge 108 and from there into the atmosphere. The compressor 14 already mentioned, an internal combustion engine 10 and a switchable coupling 12 connecting the compressor 14 to the internal combustion engine 10 are illustrated outside the compressed air preparation plant 26. The compressor 14 has an intake connection piece 22, via which the air to be compressed is sucked in. In the region of this air delivery, a 3/2-way valve 18 is arranged, which in the present case, as separately illustrated once again, is designed as an electrically pilot-controlled pneumatic valve. The pneumatic valve 18 has an input connection 110, to which a line 112 leading to the coupling connection 80 is connected. In this line 112, a nonreturn valve 40 is arranged which allows a flow from the coupling connection 80 to the valve 18 and prevents an opposite flow. The valve 18 has an output connection which is coupled to a switch input 20 of the coupling 12 via a line 116. Via an electrical input 118 for the purpose of delivering a signal 16, the valve is connected to the electronic control 32 of the compressed air preparation plant 26 and to ground which is picked off at a central plug 120.

The compressed air supply system according to FIG. 1 operates as follows in terms of the switchable coupling 12. When the coupling 12, closed in the non-pressure-activated state, is to be opened, for example in the case of a regeneration already mentioned, the electronic control 32 transmits an output signal 16 to the electrically pilot-controlled pneumatic valve 18. The valve 18 opens, and a connection is thereby made between the coupling connection 80 of the compressed air preparation plant 26 and the switch input 20 of the coupling 12. By means of the ventilation of the switch input 20, the coupling 12 is opened and the compressor 14 is stopped. To close the coupling 12, the application of current to the electrical input 118 is discontinued again, so that the switch input 20 is vented. A short switching time is ensured by the nonreturn valves 40, 42. The nonreturn valve 42 prevents a backflow of compressed air out of the line 112 in the direction of the branches of the service brake connections 58, 60 and of the connection for the parking brake and the trailer. The nonreturn valve 40 additionally prevents a backflow out of the line 112 to the secondary consumer connection 84. Depending on the design of the plant and on the requirements in terms of the switching time, one of the nonreturn valves 40, 42 may be sufficient. The nonreturn valves 40, 42 thus ensure that a certain pressure level can always be maintained in the intact line 112, so that, during the changeover of the valve 18, a rapid pressure build-up at the switch input 20 of the compressor 12 is ensured. An additional reservoir in the region of the line 112, by means of which reservoir the maintaining of such a pressure level could likewise be ensured, is therefore unnecessary. Between the connection 80 and the nonreturn valve 40, further consumers may also be connected, for example exhaust gas purification, an engine brake and/or transmission activation.

Figure 2:
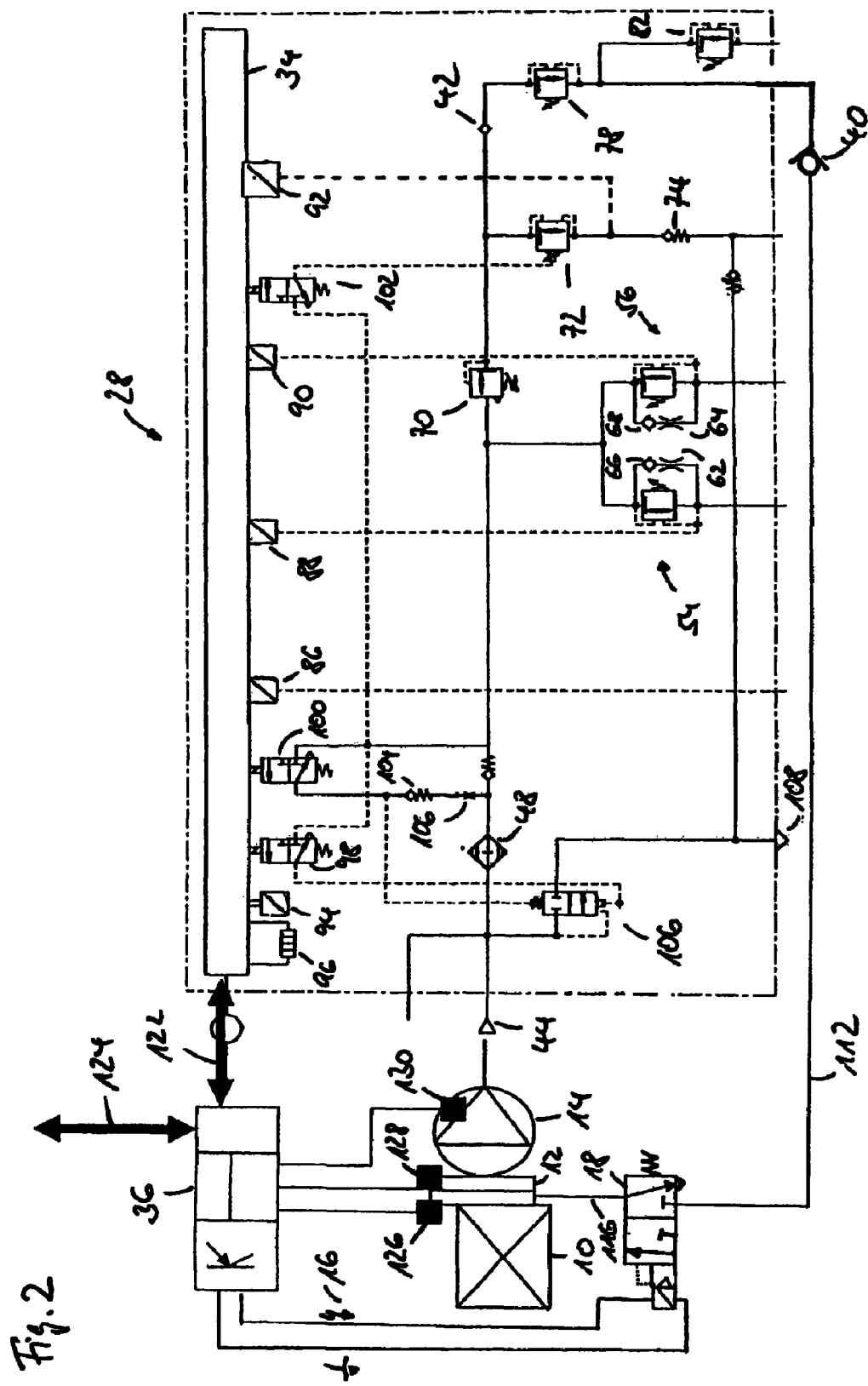
FIG. 2 shows a diagrammatic illustration of a compressed air supply system according to the invention.

FIG. 2 shows a diagrammatic illustration of a compressed air supply system according to the invention. Numerous properties of the embodiment according to FIG. 2 are identical to the embodiment according to FIG. 1, for example also the preferred arrangement of the electrically pilot-controlled pneumatic valve 18 in the region of the air inlet of the compressor 14, even though this is not illustrated here. In contrast to the embodiment according to FIG. 1, in the embodiment according to FIG. 2 an external control 36 is provided in addition to the electronic control 34 in the compressed air preparation plant 28. The external control 36 is suitable for communicating with the internal control 34 via an interface 122 which is preferably made available by the central plug 120. An interface 124 with other vehicle components is likewise provided, for example with a vehicle management computer via a CAN bus. The interfaces 122, 124 may be combined in structural terms. FIG. 2 shows, furthermore, that a rotational speed sensor 126 may be arranged on the input side of the coupling 12 and a further rotational speed sensor 128 may be arranged on the output side of the coupling 12. Moreover, a temperature sensor is provided at the compressor 14. The signals from the sensors 126, and the temperature sensor are delivered to the external control 36 and are taken into account by the latter with regard to the activation of the valve or are utilized in another way, for example for function monitoring, and/or are transferred in original or processed form via the interfaces 122, 124.

The useful determination of the rotational speeds and of the temperature may also be provided in conjunction with the embodiment according to FIG. 1, even though this is not illustrated there. The corresponding data are then delivered to the internal control 32 of the compressed air preparation plant 26.

Figure 3:
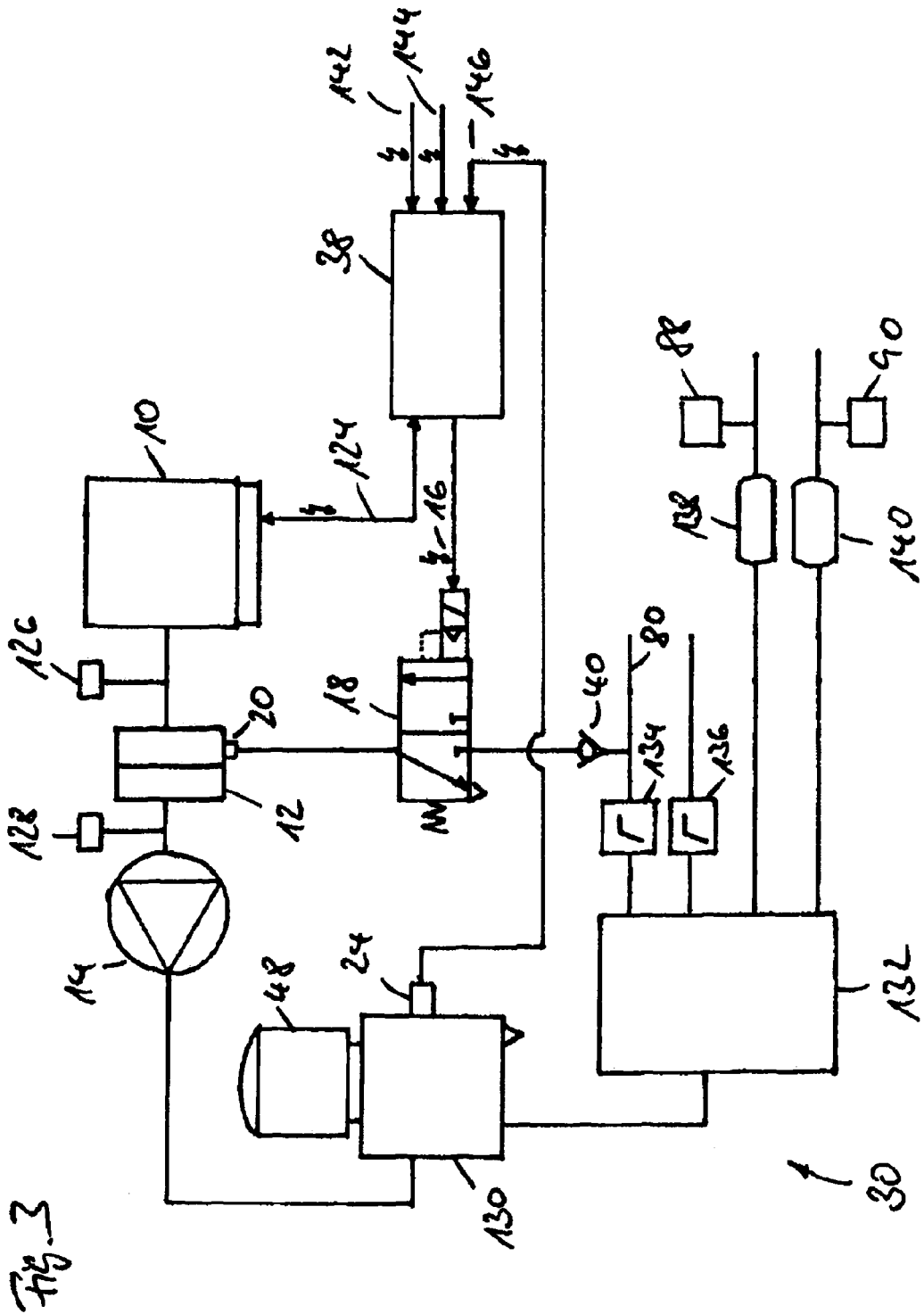
FIG. 3 shows a diagrammatic illustration of a compressed air supply system according to the invention.

FIG. 3 shows a diagrammatic illustration of a compressed air supply system according to the invention. The compressed air supply system illustrated here is illustrated in the form of a plurality of distributed individual subassemblies. In particular, a pressure controller 130 with an attached filter unit 48, a multiple-circuit protection valve 132, pressure limiters 134, 136 and an electronic control 38 are illustrated. The components may in reality be distributed in the way described. However, the distributed illustration may also be understood in the sense of a functional division, in reality the pressure controller, multiple-circuit protection valve, pressure limiters and/or electronic control being implemented in an integrated manner, for example as illustrated in connection with FIGS. 1 and 2.

In the embodiment according to FIG. 3, once again, a compressor 14 is coupled with an internal combustion engine 10 via a switchable coupling 12. The compressor 14 delivers compressed air to the pressure controller 130, from where the compressed air is transferred to the multiple-circuit protection valve 132. The multiple-circuit protection valve 132 distributes the compressed air to the reservoirs 138, 140 and other connections, one of which is illustrated as a connection provided with a pressure limiter 136. A further connection is the coupling connection 80, likewise supplied via a pressure limiter 134. Compressed air is delivered to the electrically pilot-controlled pneumatic valve 18 from the coupling connection 80 via the nonreturn valve 40 which ensures the switching times. The valve 18 is activated by means of the electronic control 38 which likewise communicates via the interface 124 with the internal combustion engine or with an engine control. The electronic control 38 has a plurality of inputs 142, 144, 146. The inputs 142, 144 symbolize the possibility of supplying the control 38 with temperature, pressure and/or rotational speed information, for example measured by the pressure sensors 88, 90 of the service brake circuits, and/or by the rotational speed sensors 126, 128 on the input side and the output side of the coupling 12. On the pressure controller 130, a pressure switch 24 is provided. This is connected to the input 146 of the electronic control 38. The electronic control 38 can thus be supplied with a pressure-dependent electrical signal.

The compressed air supply system according to FIG. 3 operates as follows. On the basis of the information made available via the inputs 142, 144, 146 and the interface 124, the electronic control 38 can deliver an electrical signal 16 to the valve 18, so that the latter changes over and opens the coupling 12 by virtue of the ventilation of the switch input 20. The decision to output the signal 16 can then take place on the basis that pressures, temperatures or rotational speeds measured by sensors make it necessary to open the coupling 12. In parallel with this, however, the opening of the coupling may also take place on the basis of the signal output by the pressure switch 24. If components of the embodiment illustrated in FIG. 3 experience a defect, so that, for example, the pressure levels in the service brake circuits are no longer measured reliably, an opening of the coupling 12 nevertheless takes place because of the presence of the pressure switch 24 and of the switch functionality thereby made possible, thus preventing destruction of said coupling due to the defects outlined.

It is likewise possible, in addition to the variant illustrated in FIG. 3, to deliver the output signal from the pressure switch 24 directly to the valve 18, so that, even in the event of a complete failure of the electronic control 38, an opening of the coupling 12 can take place.

On the basis of operating states of the compressed air preparation plant and other vehicle states, various functions can be implemented which are related to the pneumatically switchable coupling. The functions described can be implemented completely or partially by means of the embodiments described with reference to FIGS. 1 to 3, and the degree of implementability may be gathered directly from the following statements.

If the coupling is to be closed in normal operation, to be precise, in particular, in the case of a system pressure falling to the switch-on pressure level, the valve 18 is closed, so that the coupling 12 is vented and therefore closed. The coupling state is noted by a flag being set in one of the electronic controls 32, 36, 34, 38. Preconditions for this operating mode are a running internal combustion engine 10, a switched-on ignition, the absence of a faulty operating state or emergency operating state, an operating phase outside the engine start and an operating phase outside the initiation of an intermediate regeneration of the filter unit 48. The electronic signals characterizing these vehicle states are made available by the electronic engine control, the vehicle management computer, the electronic control of the compressed air preparation plant and/or another external control.

An opening of the coupling 12 takes place in normal operation when the system pressure rises to the switch-off pressure level. In this case, current is applied to the coupling switching valve 18, so that the coupling 12 is ventilated and consequently opened. The flag set during the closing of the coupling 12 is reset. Further vehicle parameters as a precondition for the opening of the coupling 12 in normal operation are, in particular, a running internal combustion engine 10, a switched-on ignition, the absence of a faulty operating phase or emergency operating phase and the absence of a servicing or workshop operating phase.

Furthermore, the compressed air supply system according to the invention is capable of carrying out an automatic emergency switch-off when the pneumatic activation line of the coupling between the coupling switching valve 18 and the coupling 12 has a leak. If, with the coupling switching valve activated and with a sufficient operating pressure for switching the valve, for example 4.5 bar, it is detected that the system pressure is falling, even though there is no circuit defect and there is no hardware defect stored in a fault store, then, after the possible check of further vehicle parameters, it is concluded that there is a break of the activation line between the valve and the coupling. Furthermore, for example, a check may be made as to whether there is an unusually frequent changeover of the coupling. The presence of a sufficient operating pressure for switching the valve 18 may be measured, depending on the design of the systems, by means of a pressure sensor which measures the pressure in the region of the trailer connection, to be precise when the output supplying the valve 18 is limited to the same pressure limiter as the trailer brake connection. A pressure sensor suitable specifically for measuring the pressure supplied to the valve 18 may likewise be provided. In order to increase the probability of the correct diagnosis of a break of the pneumatic activation line, the valve 18 may on the safe side be multiply connected in series. If a break in the pneumatic activation line is detected, the operation of the coupling valve is interrupted, that is to say the coupling always remains closed, and pressure control in the system takes place solely via the pressure controller of the compressed air preparation plant. Special functions which would additionally impede the compressed air supply system are switched off, and warning information is sent which, for example, causes a warning lamp to light up. The automatic emergency switch-off prevents the "duty cycle" of the coupling from increasing in a way which would cause the destruction of the coupling. In the case of the use of an electronic compressed air preparation plant with a characteristic map stored in its control and plotting the compressor characteristics, a pressure gradient evaluation may additionally be carried out, in order to take these into account for the purpose of the diagnosis and of the automatic emergency switch-off which possibly ultimately takes place.

In the event of a leakage elsewhere in the compressed air supply system, for example in one of the circuits, without additional measures a permanent switch-on and switch-off of the coupling 12 would likewise take place, which would lead to the destruction of the coupling 12. This can be detected at an early stage by detecting an increased switch-on duration of the coupling and therefore can be neutralized on the basis of the variation in the switching span and the associated cycle time. In this case, too, warning lamp information is preferably output.

An emergency switch-off of the operation of the coupling may also take place when the maximum pressure in the system is overshot. If it is detected, despite the activation of the coupling control valve 18, that the system pressure overshoots a maximum pressure, the operation of the coupling valve is switched off and pressure control takes place solely via the discharge valve of the compressed air preparation plant. The overshooting of the maximum pressure in spite of the activated valve 18 may have various causes, for example a driver defect, an electrical line break, a burnt-out valve coil or, for example, a defective coupling.

A further safety-enhancing function prevents the icing-up of the compressor. At low temperatures, the compressor is switched on during the switch-off phase for intermediate conveyance. If the discharge valve of the compressed air preparation plant is opened at the same time during these phases, the system pressure does not rise undesirably. It is likewise possible to allow a higher switch-off pressure level in order to implement these additional switch-on phases of the compressor 14, and therefore the discharge valve can remain closed in this case. The decision as to whether the function for preventing icing-up is to be performed may be made dependent on numerous parameters, for example the current conveyance status, the outside temperature which is available by the vehicle bus, the air drier temperature which is measured, for example, in the case of an electronic air pressure preparation plant, via a temperature sensor provided as standard, the profile of the switch-on duration of the compressor 14, the internal combustion engine temperature, the load collective of the internal combustion engine, other temperature values, for example at the pressure connection piece of the compressor 14, and the vehicle speed.

Further special functions relate, for example, to workshop operation. When the vehicle is stationary, with ignition switched on, the coupling 12 is ventilated, that is to say opened, and the compressor 14 is in the idling phase, and the onboard or offboard diagnosis indicates servicing operation, then the coupling 12 is vented by the coupling switching valve 18 being switched off, in order to reduce the risk of injury during mounting on the compressor.

It is possible, furthermore, to monitor the coupling slip on the basis of rotational speed sensor signals. The engine rotational speed and the compressor rotational speed are available via the electronic engine control in the case of suitable sensor facilities. If an excessive difference between the rotational speeds is detected and other faults, for example a circuit defect and an insufficient pressure for the coupling switching valve, can be ruled out, the switch-off pressure of the coupling 12 is reduced in steps until an appreciable slip no longer occurs. At least the presence of the auxiliary brake action can thereby be ensured, so that it is still possible to drive to a workshop. Warning lamp information is expediently made available in parallel with the reduction of the switch-off pressure level.

Moreover, an emergency switch-off can be implemented in the case of mechanical damage to the internal combustion engine 10, to be precise in the case of a crankshaft break or piston or bearing seizure. Parameters for initiating such an emergency switch-off are the engine rotational speed and the compressor rotational speed and also, optionally, the ruling out of further defects, in a similar way to the monitoring of a coupling slip. If it is determined that the pressure is not rising, even though it would actually have to do this on account of the activated conveyance, a crankshaft break may be present. A piston seizure or bearing seizure may be present, in particular, when the torque and the temperature rise. The emergency switch-off causes compressor operation to be switched off. Control then takes place via the pressure controller of the compressed air preparation plant.

An emergency switch-off can likewise be implemented when a compressor maximum temperature is determined by means of a temperature sensor provided on the compressor 14. In particular, an emergency switch-off would take place when the temperature would virtually lead to damage. In this case, too, the switch-off pressure is reduced until the temperature stabilizes at an acceptable level. As a further measure, via a request to the electronic engine control, the engine fan is switched on for the purpose of additional cooling.

A further fault may occur if the coupling piston jams during the ventilation of the coupling, for example because of a skew position. With the coupling switching valve 18 actuated and in the absence of faulty operation, the system pressure may therefore rise, even though the coupling should actually be opened. As a countermeasure, there is provision for carrying out pressure control via the pressure controller of the compressed air preparation plant.

TABLE OF REFERENCE SYMBOLS

10 Drive
12 Coupling
14 Compressor
16 Signal
18 Valve
20 Switch input
22 Fresh air supply
24 Pressure switch
26 Compressed air preparation plant
28 Compressed air preparation plant
30 Compressed air preparation plant
32 Electronic control
34 Electronic control
36 Electronic control
38 Electronic control
40 Nonreturn valve
42 Nonreturn valve
44 Input connection
46 Extraneous filling connection
48 Filter unit
50 Nonreturn valve
52 Main supply line
54 Overflow valve
56 Overflow valve
58 Connection service brake circuit
60 Connection service brake circuit
62 Throttle
64 Throttle
66 Nonreturn valve
68 Nonreturn valve
70 Pressure limiter
72 Overflow valve
74 Nonreturn valve
76 Connection parking brake/trailer
78 Overflow valve
80 Connection coupling
82 Overflow valve
84 Connection secondary consumer
86 Pressure sensor
88 Pressure sensor
90 Pressure sensor
92 Pressure sensor
94 Temperature sensor
96 Heating
98 Solenoid valve
100 Solenoid valve
102 Solenoid valve
104 Nonreturn valve
106 Discharge valve
108 Discharge
110 Input connection
112 Line
114 Output connection
116 Line
118 Electrical input
120 Central plug
122 Interface
124 Interface
126 Rotational speed sensor
128 Rotational speed sensor
130 Pressure controller
132 Multiple-circuit protection valve
134 Pressure limiter
136 Pressure limiter
138 Reservoir
140 Reservoir
142 Input
144 Input
146 Input The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air supply system for a utility vehicle, comprising:
    a compressor drivable by a drive via a pneumatically switchable coupling; and
    a valve, actuatable by an electrical signal, for selective delivery of compressed air to a switch input of the coupling,
    wherein the electrical signal is made available by an electronic control to which signals characterizing an operating state of a compressed air preparation plant and other vehicle states are deliverable, and the valve is arranged in a fresh air supply to the compressor.

2. The compressed air supply system as claimed in claim 1, wherein the electronic control is integrated into a compressed air preparation plant.

3. The compressed air supply system as claimed in claim 1, wherein the electronic control communicates via an interface with a control integrated into a compressed air preparation plant.

4. The compressed air supply system as claimed in claim 1, wherein the electrical signal is made available by the electronic control, which receives pressure-dependent input signals.

5. The compressed air supply system as claimed in claim 2, wherein the electrical signal is made available by the electronic control, which receives pressure-dependent input signals.

6. The compressed air supply system as claimed in claim 3, wherein the electrical signal is made available by the electronic control, which receives pressure-dependent input signals.

7. The compressed air supply system as claimed in claim 1, wherein the electrical signal is made available by the electronic control, which receives temperature-dependent input signals.

8. The compressed air supply system as claimed in claim 4, wherein the electrical signal is made available by the electronic control, which receives temperature-dependent input signals.

9. The compressed air supply system as claimed in claim 1, wherein the electrical signal is made available by the electronic control, which receives input signals dependent on an input-side and/or an output-side rotational speed of the coupling.

10. The compressed air supply system as claimed in claim 4, wherein the electrical signal is made available by the electronic control, which receives input signals dependent on an input-side and/or an output-side rotational speed of the coupling.

11. The compressed air supply system as claimed in claim 7, wherein the electrical signal is made available by the electronic control, which receives input signals dependent on an input-side and/or an output-side rotational speed of the coupling.

12. The compressed air supply system as claimed in claim 8, wherein the electrical signal is made available by the electronic control, which receives input signals dependent on an input-side and/or an output-side rotational speed of the coupling.

13. The compressed air supply system as claimed in claim 1, wherein an additional electrical signal is made available by a pressure switch, which responds to a pressure in a compressed air preparation plant.

14. The compressed air supply system as claimed in claim 2, wherein an additional electrical signal is made available by a pressure switch, which responds to a pressure in a compressed air preparation plant.

15. The compressed air supply system as claimed in claim 1, wherein the valve is an electrically pilot-controllable pneumatic valve.

16. The compressed air supply system as claimed in claim 1, wherein the compressed air delivered to the switch input via the valve is extracted from a compressed air preparation plant via a nonreturn valve.

17. The compressed air supply system as claimed in claim 16, wherein the nonreturn valve is integrated into the compressed air preparation plant.

18. A utility vehicle comprising:
    a compressed air supply system, the compressed air supply system comprising:
    a compressor drivable by a drive via a pneumatically switchable coupling; and
    a valve, actuatable by an electrical signal, for selective delivery of compressed air to a switch input of the coupling,
    wherein the electrical signal is made available by an electronic control to which signals characterizing an operating state of a compressed air preparation plant and other vehicle states are deliverable, and the valve is arranged in a fresh air supply to the compressor.

19. The utility vehicle as claimed in claim 18, wherein the electronic control is integrated into a compressed air preparation plant.

* * * * *